United States Patent [19]

Seitz

[11] 4,045,916
[45] Sept. 6, 1977

[54] ROLLING DRIVE ON A GEAR GRINDING MACHINE

[75] Inventor: Max Seitz, Munich, Germany

[73] Assignee: Carl Wurth Maschinen- und Zahnradfabrik, Munich, Germany

[21] Appl. No.: 632,069

[22] Filed: Nov. 14, 1975

[30] Foreign Application Priority Data

Nov. 26, 1974 Germany .............................. 2455808

[51] Int. Cl.² ............................................ B24B 17/00
[52] U.S. Cl. ................................. 51/123 G; 51/100 R
[58] Field of Search .............. 51/123 G, 124 R, 94 R, 51/95 CH, 100 R

[56] References Cited

U.S. PATENT DOCUMENTS 3,263,372  8/1966  Erhardt ............................ 51/123 G

*Primary Examiner*—James L. Jones, Jr.
*Assistant Examiner*—Nicholas P. Godici
*Attorney, Agent, or Firm*—Blanchard, Flynn, Thiel, Boutell & Tanis

[57] ABSTRACT

The invention relates to an adjusting device for an oscillating workpiece. In one type of gear grinding machine, there is provided means for effecting oscillation of the workpiece simultaneously and in synchronism with reciprocation thereof in order to enable an involute curve to be ground onto the workpiece by a grinding wheel which is fixed except for its rotation. In such machine, this oscillation is created by one or more cams fixed to the workpiece spindle, together with at least two bands fixed at one of their respective ends to such cam and at the other of their respective ends to a fixed portion of the machine with the bands being wrapped at least partially around such cam. Thus, sidewise reciprocating movement of the workpiece spindle effects oscillation of same in a known manner according to the curve provided on said cams. According to the invention, control over the details of the workpiece, particularly the pitch circle and pressure angle, may be obtained by shifting transversely the axis of the cam or cams relative to the axis of the workpiece spindle. Thus, the cams are mounted with respect to said spindle, as onto a sleeve supporting said spindle, through threaded means for effecting relative adjustment therebetween in one or more directions.

3 Claims, 3 Drawing Figures

ROLLING DRIVE ON A GEAR GRINDING MACHINE

CROSS REFERENCE TO RELATED APPLICATION

This application is related to a further application filed concurrently herewith and assigned to the same assignee as the present application, namely application Ser. No. 632 080, filed Nov. 14, 1975.

FIELD OF THE INVENTION

The invention relates to a rolling drive, and particularly to such a drive as applied to a gear grinding machine in which the rotational part of the rolling movement is accomplished by roller devices which are secured on at least one rolling cam and roll thereon and wherein the rolling cam is supported pivotally on the carriage which carries a workpiece spindle and reciprocates in synchronism with the rolling movement.

BACKGROUND OF THE INVENTION

Gear grinding machines are known in which a rolling cam, together with rolling drive means controls the movement of the workpiece during rolling of the tooth flank on the grinding disk so that an involute is ground. Said cam is secured interchangeably on the workpiece spindle or a part coupled therewith, such as on the rolling cam sleeve. Such a device is manufactured and sold by Carl Hurth Maschinen- und Zahnradfabrik of Munich, Germany, under the designation of SRS 400 Shaving Cutter and Grinding Machine and is illustrated by its bulletin SRS 400 1.0/3.75/e.

Also a rolling drive on a gear grinding machine is known in which the tension of the roll band or bands comprising the rolling drive means is responsive to at least one side of the rolling cam during the back-and-forth movement of the rolling cam carriage and same is accomplished by a guide bar or the like and a copying device through which the flank of the workpiece tooth not properly conforming to the desired involute can be corrected (German Pat. No. 2,059,521).

A rolling drive of the above-discussed type is the basis of the invention, in which the workpiece tooth flank can be corrected with simple means.

The basic purpose of the invention is attained by a rolling drive in which the pivot axis of the rolling cam can be adjusted relative to the axis of the workpiece spindle in at least one direction which lies for example parallel to the direction of movement of the rolling cam carriage. The invention can be appreciably improved by causing the pivot axis of the rolling cam to be adjustable both in the direction of the rolling movement of the rolling cam carriage and also perpendicularly thereto. The coordinates so referred to are those which are aligned perpendicularly to the axis of the workpiece spindle. The device is advantageously equipped for this purpose by providing appropriate adjusting means between a sleeve for holding said spindle and mounting means embracing same. A suitable housing or sleeve rotatably supports said spindle and it is self-supported by U-shaped member embracing said housing. Adjustment means are provided between said housing and said U-shaped means for moving the sleeve as desired with respect to said U-shaped holding device.

The device of the invention will not accomplish all of the functions of a gear grinding machine with a copying device. However, it is substantially less expensive and the correction possibilities are sufficient for many cases. By adjusting the rolling cam relative to the axis of the workpiece spindle it is possible to correct within limits the pitch circle or the pressure angle. Since this changes the position but not the radius of the rolling cam, there remains a position of inexactness, which, depending in which coordinate the adjustment is taking place, lies either at the tooth addendum or the tooth dedendum. Of course, it is also possible to combine the two coordinate adjustments, as is shown in the following exemplary embodiment. Then the circle of the adjusted rolling cam conforms sufficiently to the desired theoretical pitch circle that the error is negligible. On the other hand, it is possible to correct inaccuracies to which for example the workpiece chucking device may be subjected, with the device according to the invention namely with simpler means than with a copying device.

Further advantages and characteristics of the invention will become apparent on reading the following description.

BRIEF DESCRIPTION OF THE DRAWINGS

The invention is illustrated by the exemplary embodiment appearing in FIGS. 1 to 3.

DETAILED DESCRIPTION

Figure 1:
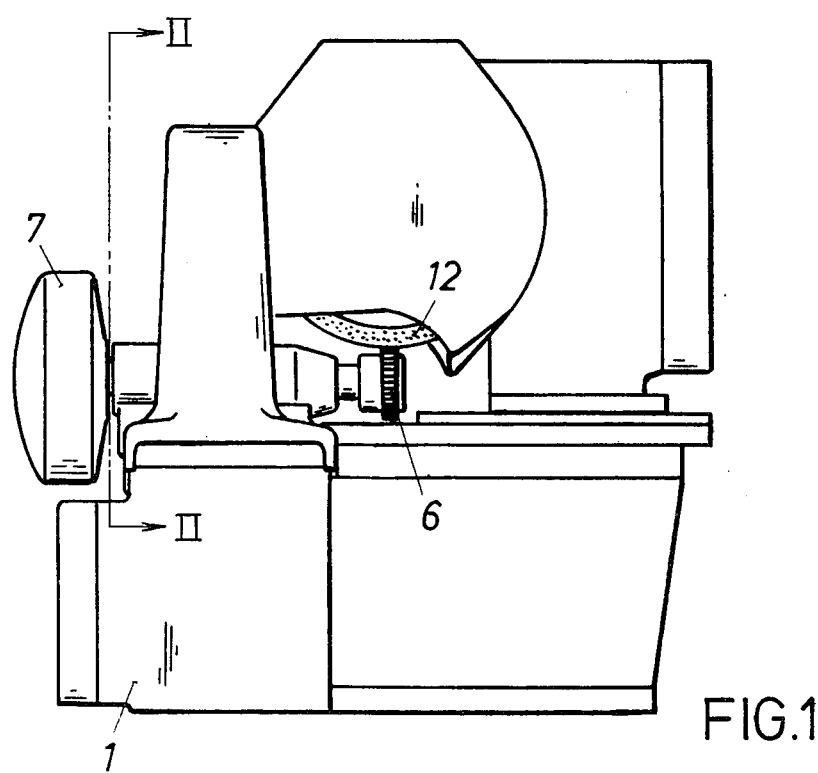
FIG. 1 illustrates a machine on which the invention can be applied.
Figure 2:
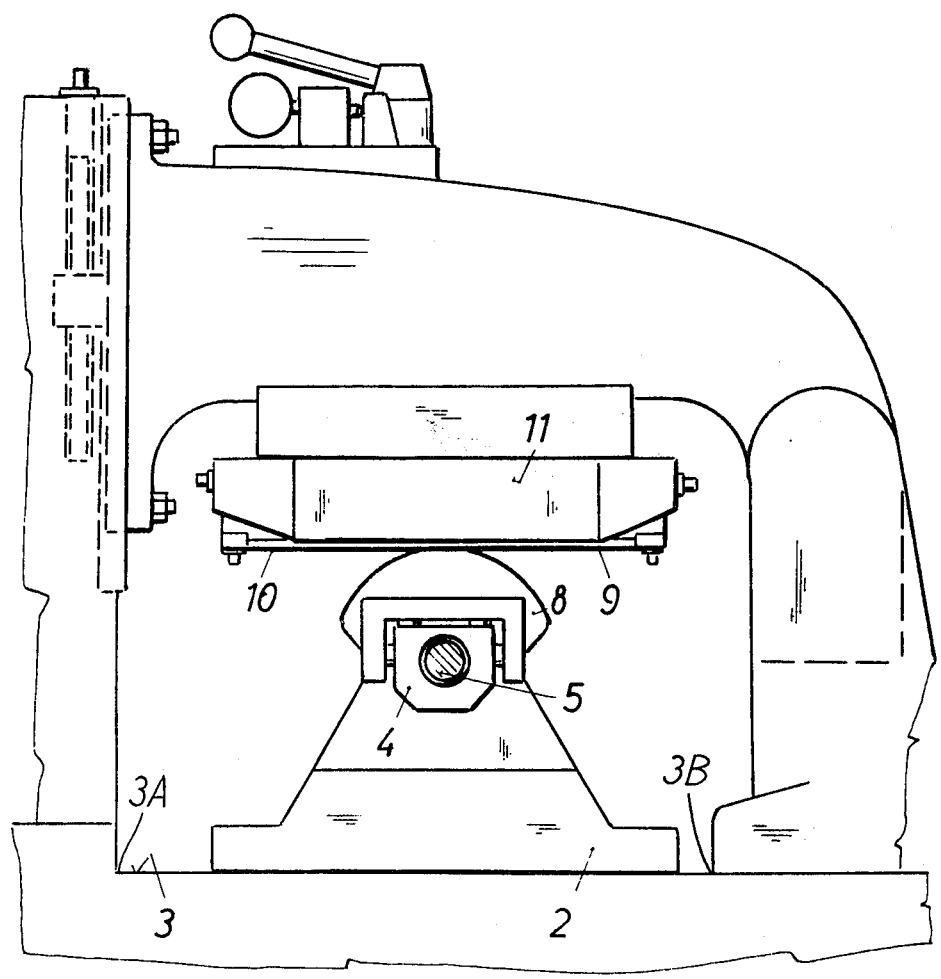
FIG. 2 schematically illustrates the rolling motion of the machine on an enlarged scale and along the line II—II of FIG. 1.

FIGS. 1 and 2 illustrate a grinding machine for tooth flanks which operates by the hob method and in which the roll motion is effected by means of a rolling cam and roller bands. The invention is applied to this machine for illustrative purposes. A rolling cam carriage 2 is supported in a suitable guideway 3 on a column 1 and is driven in a conventional manner for reciprocating movement between points 3A and 3B in the plane of FIG. 2. Transversely with respect to the direction of movement of the rolling cam carriage 2 there is rotatably supported, but not longitudinally movable, a rolling cam sleeve 4 which is conventional and therefore not shown in detail. A workpiece spindle 5 is supported in a conventional manner also rotatably and not longitudinally movably in the hollow rolling cam sleeve. The rolling cam spindle and the workpiece spindle can be supported in the same bearings. For this purpose, a roller bearing is preferred in which the rollers are installed in a conventional manner with sufficiently limited tolerances to minimize play. A workpiece 6, here a gear (a shaving gear or another toothed part) is mounted for working in a conventional manner at one end of the workpiece spindle. An indexing head 7 is provided at the other end on the workpiece sleeve or on the rolling cam sleeve, which indexing head 7 effects the indexing movement from tooth to tooth of the workpiece. Since the mode of operation of the pitch device is known and itself is not part of the invention, it is not shown in more detail. Deformable roll bands 9, 10 are secured on one end of each thereof on the rolling cam and on their other ends on a roller band holder 11. If the rolling cam carriage 2 is moved back and forth in the guideway 3 (parallel to the image plane of FIG. 2), then the roller bands, as is known, roll on the rolling cam(s) and effect oscillation thereof. Simultaneously therewith one tooth of the workpiece 6 is presented to the grinding disk 12. If the axis 13 of the rolling cam lies on the axis 14 of the workpiece spindle (in contrast with the arrangement of FIG. 3), then the workpiece tooth flank is ground to follow an involute. This operation is known.

Figure 3:
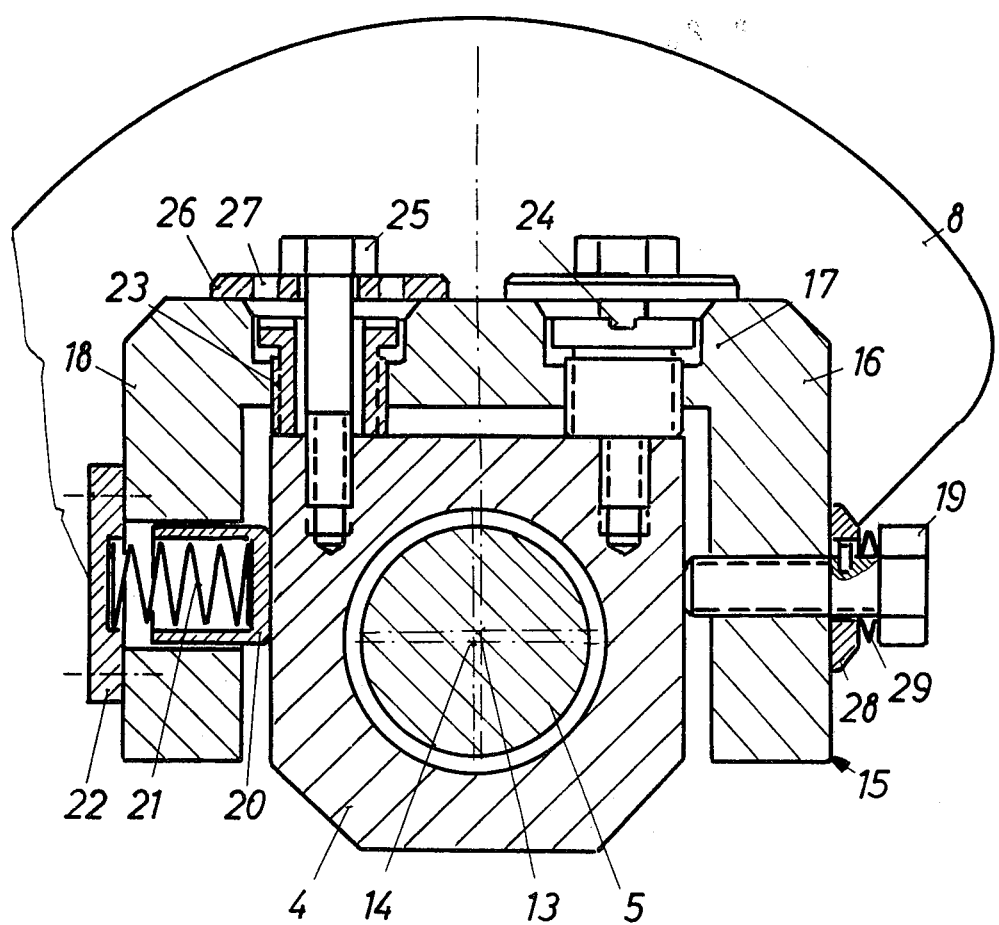
FIG. 3 illustrates in an enlarged scale a detail of an adjusting device according to the invention, same being a sectional view taken transversely centrally therethrough.

FIG. 3 shows how the rolling cam is secured adjustably on the rolling cam sleeve. The rolling cam 8 is positioned on a U-shaped holding device 15, which has parallel legs 16 and 18 connected by a bight portion 17. These legs and the bight portion embrace, though with some play, around the rolling cam sleeve 4. In one side leg 16, there is provided an adjusting screw 19 in front of the rolling cam 8 and another similar one behind same. In the oppositely positioned leg 18 there is supported longitudinally movably at least one pressure piece 20, which is urged by a spring 21 against the rolling cam sleeve 4. One end of the spring is supported on a cover 22 which is secured on the leg 18. With the adjusting screw 19 and the pressure piece 20, it is possible to adjust the rolling cam 8 relative to the workpiece spindle 5 such that the axis 13 of the rolling cam lies more or less as desired laterally of the axis of the workpiece spindle.

In the upper leg 17 of the U-shaped holding device in front of and behind the rolling cam there are threaded a pair of adjusting sleeves 23, which serve as supports for the rolling cam. Depending on how the adjusting screws are adjusted, the axis of the rolling cam can be adjusted a greater or lesser distance above or below the workpiece spindle axis. The adjusting screws have slots 24, holes or the like, in order to be operable by a wrench or screwdriver.

Each fastening screw 25 extends through the adjusting screws, the screw head of which fastening screw can be placed on each washer 26 lying on the leg 17, so that after adjusting the rolling cam the U-shaped holding device can be screwed fixedly to the rolling cam sleeve 4. The washers 26 have holes 27, to provide access by a wrench to the slots of the adjusting sleeves. This part of the device can also be constructed such that in the adjusting sleeves there are provided upwardly extending pins or equivalent means, which extend into at least one of the holes 27 or the like. The wrench can then be placed on the washer, in order to rotate the adjusting sleeves. Furthermore the washer can then be provided with a scale or mark in order to simplify the adjustment.

Also, the adjusting screws 19 can each be provided with a dial 28, which is connected longitudinally movably or rotationally fixed to the adjusting screw. They are each urged against the leg 16 by springs of which one appears at 29. Also these dials are used to simplify the adjustment.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A gear grinding machine for grinding teeth or workpieces, comprising:
    a rotatable workpiece spindle;
    a rotary grinding wheel;
    rolling motion producing means including a movable rolling cam carriage and a rolling cam pivotally supported thereon and arranged to reciprocate said workpiece spindle in a predetermined path; and
    adjusting means for adjusting the pivot axis of said rolling cam relative to the axis of said workpiece spindle.

2. A gear grinding machine according to claim 1, wherein said adjusting means includes support means for supporting said pivot axis of said rolling cam for movement relative to said workpiece spindle axis both in direction of movement of said rolling cam carriage and at a right angle thereto.

3. A gear grinding machine according to claim 1, wherein said adjusting means includes a U-shaped holding device adjustably secured to a rolling cam sleeve which embraces said workpiece spindle, said adjustable securement including adjusting screws in the legs of said U-shaped holding device and engaging said rolling cam sleeve whereby the pivot axis of said rolling cam can be adjusted relative to the axis of rotation of said workpiece spindle.

* * * * *

UNITED STATES PATENT AND TRADEMARK OFFICE
CERTIFICATE OF CORRECTION

PATENT NO. : 4 045 916
DATED : September 6, 1977
INVENTOR(S) : Max Seitz

It is certified that error appears in the above-identified patent and that said Letters Patent are hereby corrected as shown below:

Change spelling of assignee from "Wurth" to ---Hurth---.

Column 4, line 20; change "or" to ---on---.

Signed and Sealed this

Twentieth Day of December 1977

[SEAL]

Attest:

RUTH C. MASON
Attesting Officer

LUTRELLE F. PARKER
Acting Commissioner of Patents and Trademarks